United States Patent
Mo (10) Patent No.: US 9,971,960 B2
(45) Date of Patent: May 15, 2018

(54) METHOD AND SYSTEM FOR PROVIDING GESTURE RECOGNITION SERVICES TO USER APPLICATIONS

(71) Applicant: Audun Bjornerud Mo, Oslo (NO)

(72) Inventor: Audun Bjornerud Mo, Oslo (NO)

(73) Assignee: XESTO INC., Toronto (CA)

( * ) Notice: Subject to any disclaimer, the term of this patent is extended or adjusted under 35 U.S.C. 154(b) by 44 days.

(21) Appl. No.: 15/165,807

(22) Filed: May 26, 2016

(65) Prior Publication Data

US 2017/0344859 A1    Nov. 30, 2017

(51) Int. Cl.
*G06K 9/62* (2006.01)
*G06K 9/66* (2006.01)
*G06F 3/01* (2006.01)

(52) U.S. Cl.
CPC ............... *G06K 9/66* (2013.01); *G06F 3/017* (2013.01)

(58) Field of Classification Search
CPC . G06K 9/66; G06F 3/017; G06N 3/02; G06N 3/08; G06N 99/005
See application file for complete search history.

(56) References Cited

U.S. PATENT DOCUMENTS

| | | | | |
|---|---|---|---|---|
| 2012/0225719 A1* | 9/2012 | Nowozin | ............ | G06K 9/00342 463/36 |
| 2014/0184496 A1* | 7/2014 | Gribetz | ................ | G02B 27/017 345/156 |
| 2015/0078613 A1* | 3/2015 | Forutanpour | ........... | G06F 3/017 382/103 |
| 2015/0185837 A1* | 7/2015 | Whitney | ................ | G06F 3/014 345/156 |
| 2016/0335534 A1* | 11/2016 | Nere | ...................... | G06N 3/049 |
| 2017/0161607 A1* | 6/2017 | English | ................... | G06N 3/08 |

* cited by examiner

*Primary Examiner* — Samir Ahmed (57) ABSTRACT

A method for providing gesture recognition services to a user application, comprising: storing sets of training data in a database at a server, the training data received from a sensor associated with the user application, the training data being indicative of characteristics of a gesture, the user application running on a client device; training a gesture recognition algorithm with the sets of training data to generate a trained gesture recognition algorithm, the output of the trained gesture recognition algorithm being an indication of the gesture; storing the trained gesture recognition algorithm in a client library at the server; receiving raw data from the sensor via the user application and storing the raw data in the client library; applying the trained gesture recognition algorithm to the raw data; and, when the trained gesture recognition algorithm recognizes the gesture, sending the indication of the gesture from the client library to the user application.

20 Claims, 6 Drawing Sheets

METHOD AND SYSTEM FOR PROVIDING GESTURE RECOGNITION SERVICES TO USER APPLICATIONS

FIELD OF THE APPLICATION

This application relates to the field of gesture recognition and data processing, and more specifically, to a method and system for providing gesture recognition services to user applications.

BACKGROUND OF THE APPLICATION

Gesture recognition refers to the interpretation of human gestures via mathematical algorithms for use by user applications. Gestures can originate from any bodily motion or state but commonly originate from the face or hand. Gesture recognition is way for computers to understand human body language, thus building a better bridge between humans and machines than that provided by text based and graphical user interfaces. Gesture recognition enables humans to communicate with computers and to interact naturally without any mechanical devices. For example, using gesture recognition concepts, it is possible for a user to point a finger at a computer screen and direct a cursor to move on the screen without the use of a input device such as a mouse.

One problem with existing methods and systems for gesture recognition is that they are typically device and gesture limited. In particular, existing gesture recognition application programming interfaces ("APIs") are typically unable to learn to recognized new gestures. This can be frustrating for application developers if they want their applications to react to specific custom gestures. Similarly, existing solutions are often device specific. That is, the gesture recognition capabilities provided by hardware suppliers are often specific to one device only. This is problematic as users typically have and use a number of different hardware devices. Furthermore, existing methods and systems typically do not allow for reuse of gesture recognition training data.

A need therefore exists for an improved method and system for providing gesture recognition services to user applications. Accordingly, a solution that addresses, at least in part, the above and other shortcomings is desired.

SUMMARY OF THE APPLICATION

According to one aspect of the application, there is provided a method for providing gesture recognition services to a user application, comprising: storing sets of training data in a database at a server, the training data received from a sensor associated with the user application, the training data being indicative of characteristics of a gesture, the user application running on a client device; training a gesture recognition algorithm with the sets of training data to generate a trained gesture recognition algorithm, the output of the trained gesture recognition algorithm being an indication of the gesture; storing the trained gesture recognition algorithm in a client library at the server; receiving raw data from the sensor via the user application and storing the raw data in the client library; applying the trained gesture recognition algorithm to the raw data; and, when the trained gesture recognition algorithm recognizes the gesture, sending the indication of the gesture from the client library to the user application.

In accordance with further aspects of the application, there is provided an apparatus such as a data processing system, a gesture recognition system, a dataset analysis system, etc., a method for adapting same, as well as articles of manufacture such as a computer readable medium or product and computer program product or software product (e.g., comprising a non-transitory medium) having program instructions recorded thereon for practising the method of the application.

BRIEF DESCRIPTION OF THE DRAWINGS

Further features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE EXAMPLE EMBODIMENTS

In the following description, details are set forth to provide an understanding of the application. In some instances, certain software, circuits, structures and methods have not been described or shown in detail in order not to obscure the application. The terms "data processing system", "gesture recognition system", "dataset analysis system", etc. are used herein to refer to any machine for processing data, including the computer systems, wireless devices, and network arrangements described herein. The present application may be implemented in any computer programming language provided that the operating system of the data processing system provides the facilities that may support the requirements of the present application. Any limitations presented would be a result of a particular type of operating system or computer programming language and would not be a limitation of the present application. The present application may also be implemented in hardware or in a combination of hardware and software.

The present application provides a method and system for gesture recognition. According to one embodiment of the application, there is provided a single central tool for gesture recognition that may be used by developers and their user applications to reduce development time. The present application provides a library for training of gesture recognition algorithms as well as a database for storing the training data. This allows users to reuse old gesture data and to access a large set of training data created by others.

According to one embodiment of the application, a system or platform as a service ("PaaS") is provided for gesture recognition. The system provides for the analysis, storage, and distribution of gesture recognition data and algorithms for user applications. Advantageously, the user application does not have to perform mathematical operations, etc., thus off loading that need from user applications. The developer of the user application need only click, record, and write a few lines of code to enable the user application to react to end user gestures.

According to another embodiment, an application program interface ("API") is provided that provides developers working with motion gesture recognition hardware the tools required to recognize and record unique gestures. Movement is often considered to be weird, complicated, and not easy to program for. The present application provides tools to improve both recognition time and accuracy. These tools work with the motion sensors in any hand held or wireless device.

The present application uses a machine learning algorithm for gesture recognition. The machine learning ("ML") algorithm may be cloud based. The ML algorithm performs calculations for the user application and provides what the user application needs to look for as a trained ML algorithm. The system may also store training examples for the user application.

Figure 1:
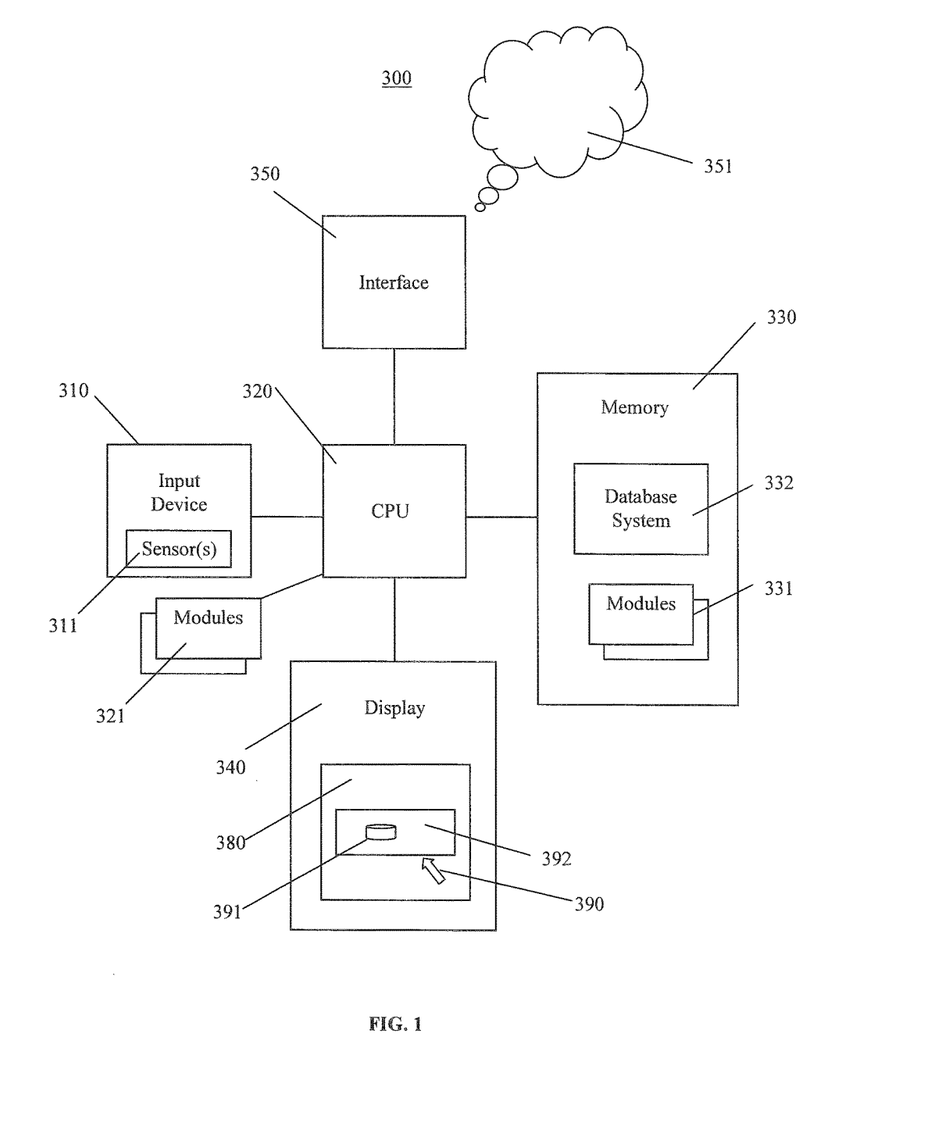
FIG. 1 is a block diagram illustrating a data processing system in accordance with an embodiment of the application.

FIG. 1 is a block diagram illustrating a data processing system 300 in accordance with an embodiment of the invention. The data processing system 300 is suitable for image and data processing, management, storage, and for generating, displaying, and adjusting presentations in conjunction with a user interface or a graphical user interface ("GUI"), as described below. The data processing system 300 may be or include a gesture recognition system (e.g., 100). The data processing system 300 may be a client and/or server in a client/server system (e.g., 100). For example, the data processing system 300 may be a server system or a personal computer ("PC") system. The data processing system 300 may also be a mobile device or other wireless, portable, or handheld device. The data processing system 300 may also be a distributed system which is deployed across multiple processors. The data processing system 300 may also be a virtual machine. The data processing system 300 includes an input device 310, at least one central processing unit ("CPU") 320, memory 330, a display 340, and an interface device 350. The input device 310 may include a keyboard, a mouse, a trackball, a touch sensitive surface or screen, a position tracking device, an eye tracking device, a camera, a tactile glove or gloves, a gesture control armband, or a similar device. In particular, the input device 310 may include one or more motion sensors 311 for sensing motion in three dimensions for facilitating gesture recognition. The display 340 may include a computer screen, a television screen, a display screen, a terminal device, a touch sensitive display surface or screen, a hardcopy producing output device such as a printer or plotter, a head-mounted display, virtual reality ("VR") glasses, an augmented reality ("AR") display, a hologram display, or a similar device. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices.

The interface device 350 may include one or more network connections. The data processing system 300 may be adapted for communicating with other data processing systems (e.g., similar to data processing system 300) over a network 351 via the interface device 350. For example, the interface device 350 may include an interface to a network 351 such as the Internet and/or another wired or wireless network (e.g., a wireless local area network ("WLAN"), a cellular telephone network, etc.). As such, the interface 350 may include suitable transmitters, receivers, antennae, etc. In addition, the data processing system 300 may include a Global Positioning System ("GPS") receiver. Thus, the data processing system 300 may be linked to other data processing systems by the network 351. The CPU 320 may include or be operatively coupled to dedicated coprocessors, memory devices, or other hardware modules 321. The CPU 320 is operatively coupled to the memory 330 which stores an operating system (e.g., 331) for general management of the system 300. The CPU 320 is operatively coupled to the input device 310 for receiving user commands, queries, or data and to the display 340 for displaying the results of these commands, queries, or data to the user. Commands, queries, and data may also be received via the interface device 350 and results and data may be transmitted via the interface device 350. The data processing system 300 may include a data store or database system 332 for storing data and programming information. The database system 332 may include a database management system (e.g., 332) and a database (e.g., 332) and may be stored in the memory 330 of the data processing system 300. In general, the data processing system 300 has stored therein data representing sequences of instructions which when executed cause the method described herein to be performed. Of course, the data processing system 300 may contain additional software and hardware a description of which is not necessary for understanding the application.

Thus, the data processing system 300 includes computer executable programmed instructions for directing the system 300 to implement the embodiments of the present application. The programmed instructions may be embodied in one or more hardware modules 321 or software modules 331 resident in the memory 330 of the data processing system 300 or elsewhere (e.g., 320). Alternatively, the programmed instructions may be embodied on a computer readable medium or product (e.g., one or more digital video disks ("DVDs"), compact disks ("CDs"), memory sticks, etc.) which may be used for transporting the programmed instructions to the memory 330 of the data processing system 300. Alternatively, the programmed instructions may be embedded in a computer-readable signal or signal-bearing medium or product that is uploaded to a network 351 by a vendor or supplier of the programmed instructions, and this signal or signal-bearing medium or product may be downloaded through an interface (e.g., 350) to the data processing system 300 from the network 351 by end users or potential buyers.

A user may interact with the data processing system 300 and its hardware and software modules 321, 331 using a user interface such as a graphical user interface ("GUI") 380 (and related modules 321, 331). The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input device 310 such as a mouse. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input device (e.g., a mouse) 310 to position a pointer or cursor 390 over an object (e.g., an icon) 391 and by selecting or "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Figure 2:
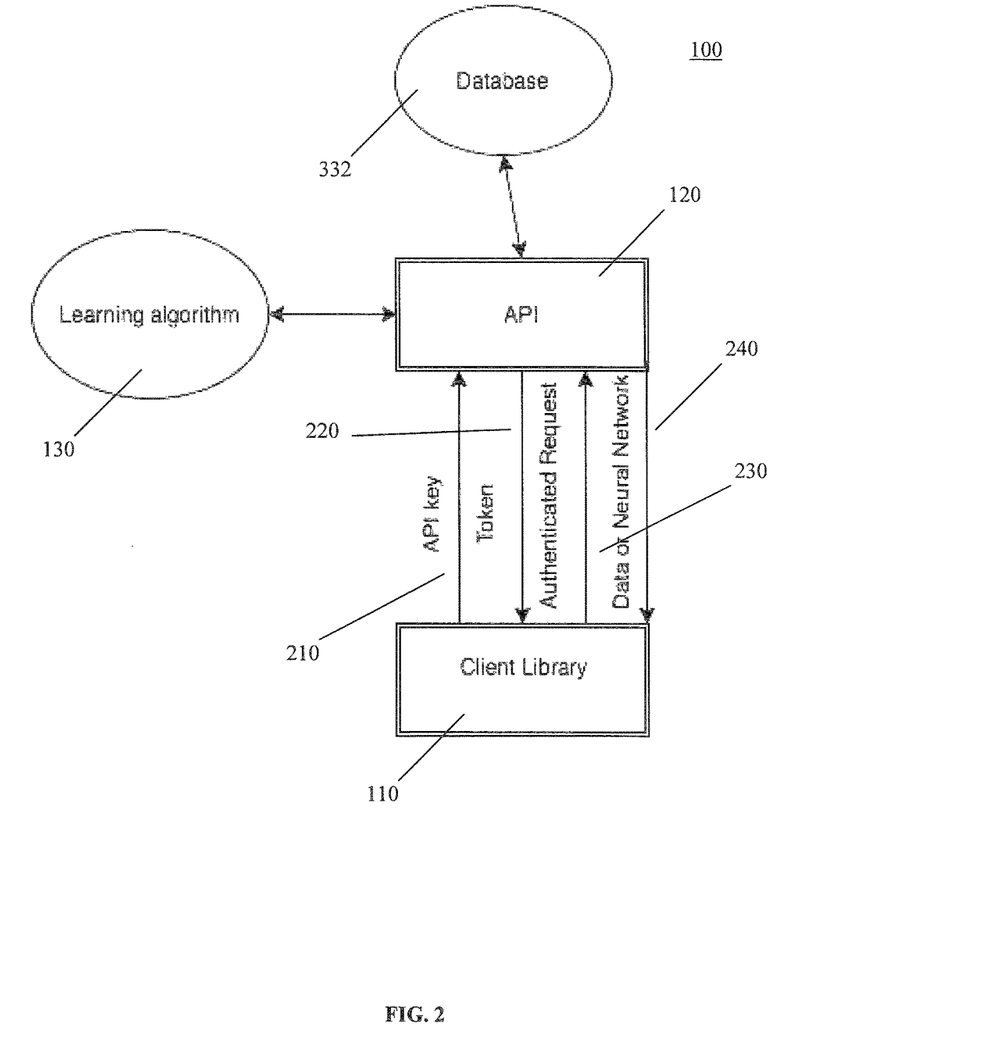
FIG. 2 is a block diagram illustrating a gesture recognition system for generating trained neural networks for gesture recognition for use by user applications in accordance with an embodiment of the application.

FIG. 2 is a block diagram illustrating a gesture recognition system 100 for generating trained neural networks for gesture recognition for use by user applications in accordance with an embodiment of the application. The system 100 may be implemented within the data processing system 300 of FIG. 1 using software modules 331 and/or hardware modules 321 or may have a configuration similar to that of the data processing system 300. The system 100 includes a client library 110, an application programming interface ("API") 120, and a learning algorithm 130. The system 100 provides a platform for training neural networks to recognize given "gestures" (i.e., distinct human movement such as a hand wave, etc.). These neural networks are then served up or delivered via the API (e.g., a cloud based API) to developers who may pay a monthly fee to an associated service provided to access the neural networks.

The client library 110 is responsible for communicating with the API 120. The client library fetches 220 a required security token by authenticating 210 an API key and then requests 230 a neural network associated with the API key and/or its metadata, for example, gesture names. When the client library 110 receives 240 the neural network, it then sets it to look at all incoming data from a gesture sensor(s) 311 to have it look for gestures it recognises. It also filters and formats the incoming data to make sure that the neural network is given the set of features that the input layer expects.

The API 120 contains the server's rules for how the outside world may communicate with its database 332 or the learning algorithm 130. According to one embodiment, the API 120 ensures that neural networks are only distributed to a user's device if the account associated with the user's device, for which the neural networks have been trained, has been charged for the service, and that all requests are safe (i.e., as in safe request strings, etc.), authenticated, and within the rate limits set by their payment plan. According to another embodiment, the neural networks may also be distributed as one-time downloadable packages which are then packaged by the developer as a dependency of their application as opposed to being downloaded at run time by the client library 110 via the cloud API 120.

The learning algorithm 130 is a neural network whose features include the number of elements within a segmented data input from the sensor(s) 311, and the speed and direction of those elements. The outputs or output layer of the learning algorithm 130 includes one node for each gesture that was provided by the training data.

The system 100 provides the ability to learn new gestures. The flexibility of neural networks enable the system 100 to learn any gesture. This is simply a matter of adding another class and retraining the neural network on new data. The system 100 also provides a recognition strategy that is not device bound. Once the system's client library 110 is implemented for a new device, it formats all incoming data to conform to the learning and recognition strategy. This means that the underlying recognition technology may be reused to classify gesture data for any device so long as the client library 110 has been built. The system 100 also provides for data persistence. The system 100 logs all training data in its database 332, and because of this, it can retrain any neural network on any of stored datasets at any time. This also allows the system 100 to share the datasets with users or developers who did not submit them, thus allowing users or developers to train their neural networks on vastly greater datasets than the ones they could produce themselves. This results in greater recognition accuracy and reduces the workload for users and developers as they don't have to spend time developing large datasets of their own.

The methods by which the system 100, 300 trains a gesture recognition neural network and then applies that trained neural network to raw data from a user application is described with reference to FIGS. 3 and 4 in the following.

Figure 3:
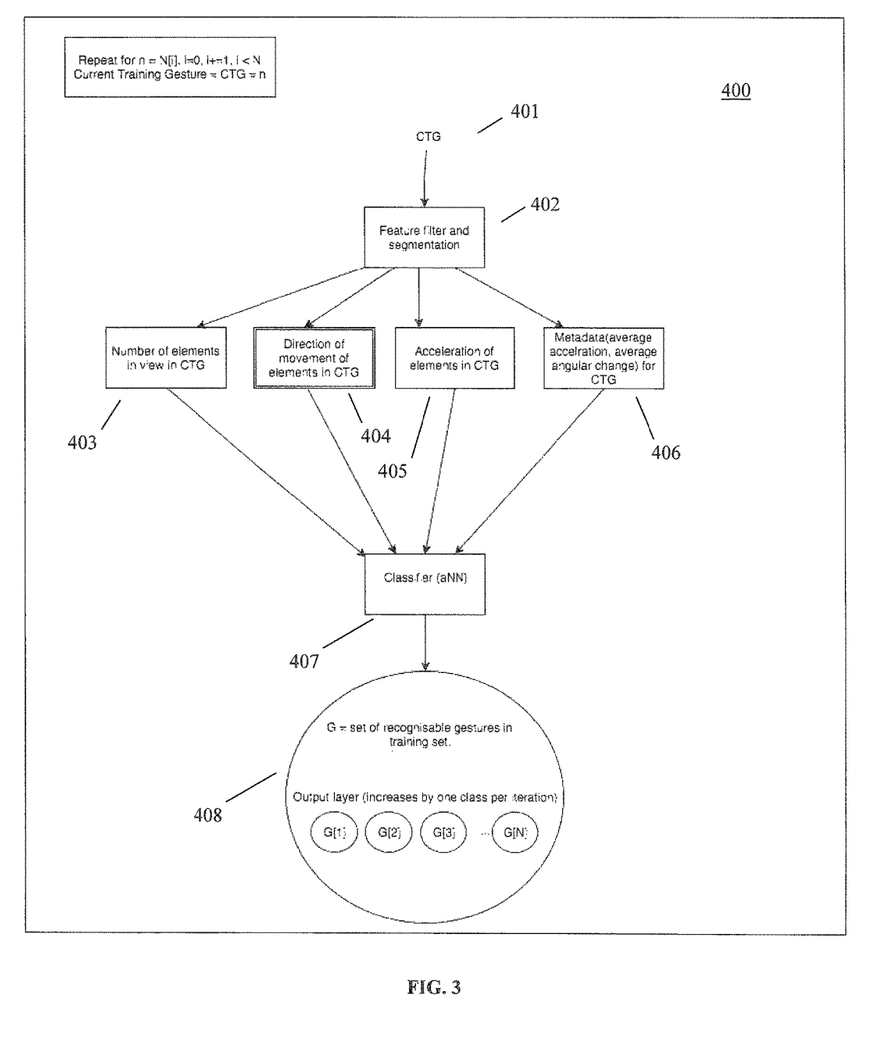
FIG. 3 is a flow chart illustrating operations of modules within a data processing system for training a gesture recognition neural network in accordance with an embodiment of the application.

FIG. 3 is a flow chart illustrating operations 400 of modules (e.g., 331) within a data processing system (e.g., 100, 300) for training a gesture recognition neural network in accordance with an embodiment of the application.

At step 401, the operations 400 start for a current training gesture ("CTG"). The operations 400 will be repeated for each recognisable gesture in a training set (N). Each gesture may have a number of training examples.

At step 402, for the CTG, the features of the gesture are filtered and segmented.

At step 403, the number of elements in view in the CTG is determined. The number of elements are the number of discrete objects that the sensor(s) 311 can see, identify, or be associated with (e.g., a user's hands, fingers, etc.).

At step 404, the direction of movement of the elements in the CTG is determined.

At step 405, the acceleration of the elements in the CTG is determined.

At step 406, metadata (e.g., average acceleration, average angular change, etc.) for the elements in the CTG is determined.

At step 407, the outputs of steps 402-406 are applied to a classifier or neural network.

At step 408, a set of recognisable gestures in the training set is generated from the output of the neural network and the operations 400 end.

According to one embodiment, each of the above steps 401-408 may be implemented by a respective software module 331. According to another embodiment, each of the above steps 401-408 may be implemented by a respective hardware module 321. According to another embodiment, each of the above steps 401-408 may be implemented by a combination of software 331 and hardware modules 321. For example, FIG. 3 may represent a block diagram illustrating the interconnection of specific hardware modules 401-408 (collectively 321) within the data processing system 100, 300, each hardware module 401-408 adapted or configured to implement a respective step of the method of the application.

Figure 4:
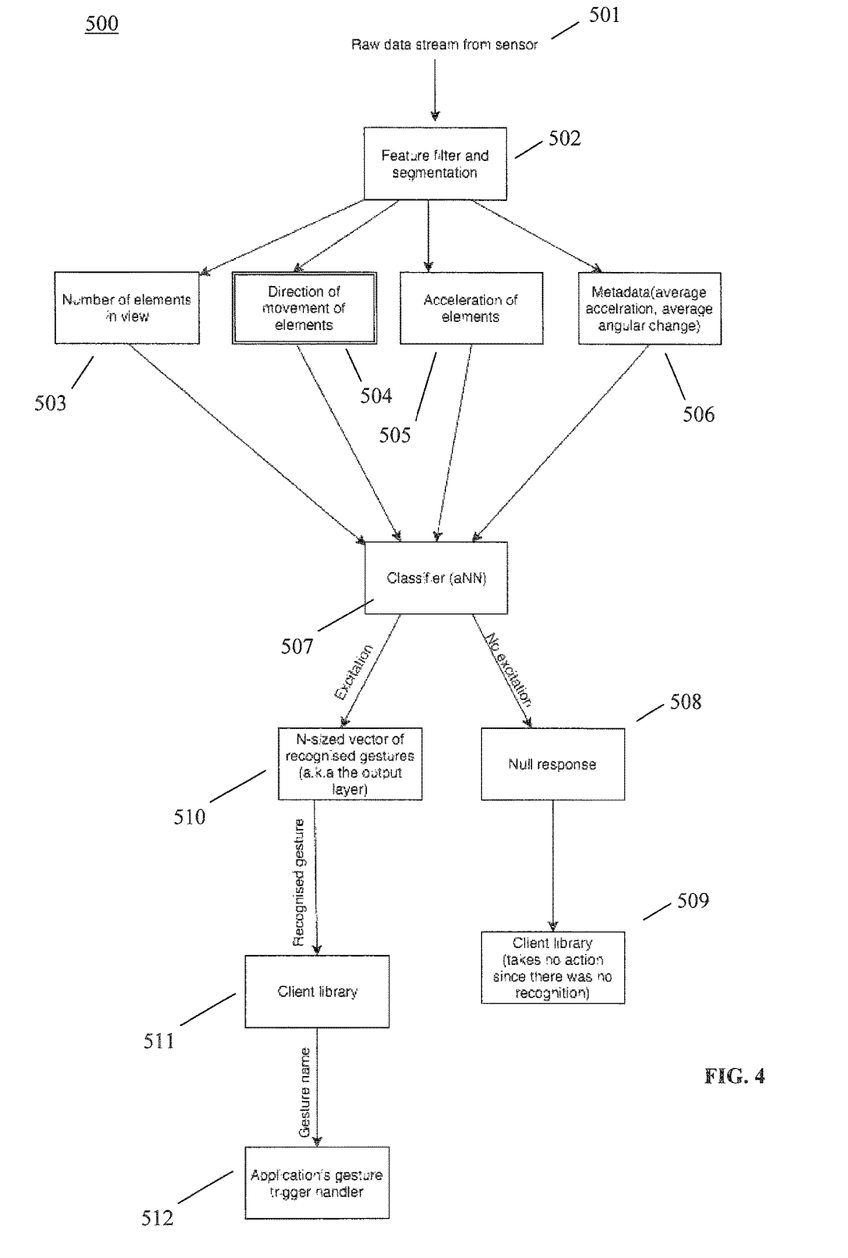
FIG. 4 is a flow chart illustrating operations of modules within a data processing system for using a trained gesture recognition neural network to recognize a gesture in accordance with an embodiment of the application.

FIG. 4 is a flow chart illustrating operations 500 of modules (e.g., 331) within a data processing system (e.g., 100, 300) for using a trained gesture recognition neural network to recognize a gesture in accordance with an embodiment of the application.

At step 501, the operations 500 start when raw data is received from the sensor(s) 311.

At step 502, the data is filtered and segmented.

At step 503, the number of elements in view in the raw data is determined. As above, the number of elements are the number of discrete objects that the sensor(s) 311 can see, identify, or be associated with (e.g., a user's hands, fingers, etc.).

At step 504, the direction of movement of the elements in the raw data is determined.

At step 505, the acceleration of the elements in the raw data is determined.

At step 506, metadata (e.g., average acceleration, average angular change, etc.) for the elements in the raw data is determined.

At step 507, the outputs of steps 502-506 are applied to a classifier or neural network. The neural network at this step has been trained by the operations illustrated in FIG. 3 and described above.

At step 508, if the neural network does not recognize a gesture, then a null response is the outcome and operations proceed to step 509.

At step 509, the client library 110 takes no action as a gesture was not recognized.

At step 510, if the neural network does recognize a gesture, then a N-sized vector of recognized gestures (a.k.a., the output layer) is generated.

At step 511, the recognized gestures are received by the client library 110.

At step 512, a gesture name is generated for each recognized gesture and is transmitted or output from the client library 110 to the gesture trigger handler of the user application and the operations 500 end.

According to one embodiment, each of the above steps 501-512 may be implemented by a respective software module 331. According to another embodiment, each of the above steps 501-512 may be implemented by a respective hardware module 321. According to another embodiment, each of the above steps 501-512 may be implemented by a combination of software 331 and hardware modules 321. For example, FIG. 4 may represent a block diagram illustrating the interconnection of specific hardware modules 501-512 (collectively 321) within the data processing system 100, 300, each hardware module 501-512 adapted or configured to implement a respective step of the method of the application.

To improve the performance of the above methods, the system 100, 300 may include a dataset analysis system 600 for first determining similar sets of training data from the sets of training data stored in the database 332. This data analysis system 600 is described with reference to FIGS. 5 and 6 in the following.

Figure 5:
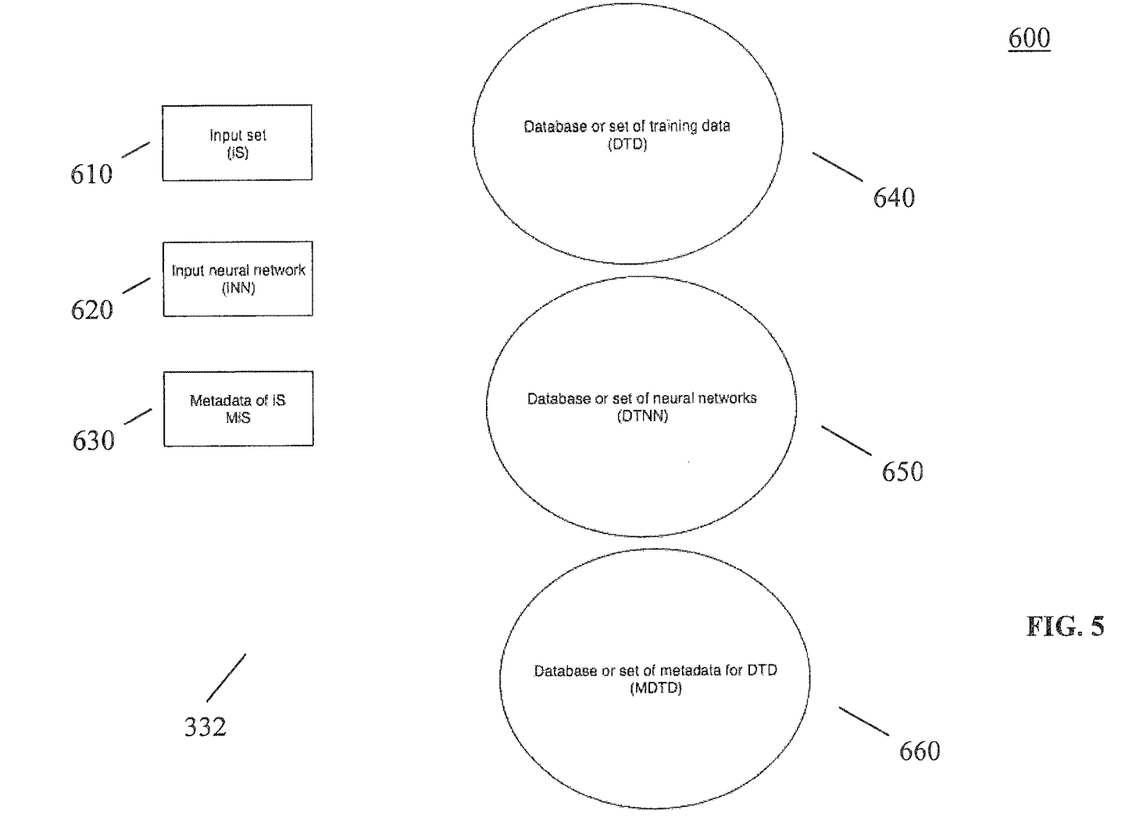
FIG. 5 is a block diagram illustrating a dataset analysis system for determining similar datasets for training a neural network in accordance with an embodiment of the application; and, FIG. 6 is a flow chart illustrating operations of modules within a data processing system for identifying similar datasets in a database of machine learning training data, in accordance with an embodiment of the application.

FIG. 5 is a block diagram illustrating a dataset analysis system 600 for determining similar datasets for training a neural network in accordance with an embodiment of the application. The system 600 may be implemented within the data processing system 300 of FIG. 1 using software modules 331 and/or hardware modules 321 or may have a configuration similar to that of the data processing system 300. The system 600 may be used to find similar datasets of training data in a database 332. The system 600 may be used in combination with the above described gesture recognition system 100 for generating trained neural networks for gesture recognition for use by user applications, or, it may be used for any application where many separate AIs or machine learning algorithms need to be trained in very specific tasks. In particular, the system 600 may be used to implement a method (described further below with reference to FIG. 6) for finding similar datasets for the training of supervised classification neural networks.

According to one embodiment, the system 600 includes: a database (e.g., 332) having a set of supervised neural network training data in the same domain (referred to as "T" below) 640, a set of classification machine learning algorithms each trained on their own subset of T (referred to as "N" below) 650, and a set of metadata for each member of T (referred to as "M" below) 660; an initial set of data or "the seed" (referred to as "s" below) 610; and, a classification machine learning algorithm trained on s (referred to as "ns" below) 620. In addition, the system 600 requires a hit threshold (referred to as "thresh" below).

The system 600 solves the following problem: Given some s and ns, does there exist one or more subsets t in T where s and t are similar?

To solve this problem, the system 600 first finds a subset of M which is similar to the generated metadata 630 of s. It does this by creating a k-nearest-neighbors cluster of subsets inside M with the metadata 630 of s as its root, where k is any positive integer that is less than or equal to (i.e., <=) the total amount of members in M. It then takes every subset of M within that cluster and finds its associated datasets in T, and the network trained on that data in N.

Next, the system 600 takes every one of those datasets from T and runs them on ns to generate confusion matrices for each member. If any of those confusion matrices generate an accuracy score that is higher than or at thresh for any class, it takes s and runs it on the associated algorithms from N for the datasets from T that generated the high scores, to generate more confusion matrices. If any of those confusion matrices are at or higher than thresh, the training data for the algorithms that scored high in accuracy for some class with s is returned. This set is similar to s.

For reference, in the field of machine learning and specifically the problem of statistical classification, a confusion matrix is a specific table layout that allows visualization of the performance of an algorithm, typically a supervised learning one. Each column of the matrix represents the instances in a predicted class while each row represents the instances in an actual class (or vice-versa).

The system 600 may also use a different clustering method than k-nearest-neighbors. In particular, s may represent one or many different classes. The system 600 may also work on other machine learning classification algorithms, not necessarily neural networks, such as, but not limited to: support vector machines ("SVMs), decision trees, and Bayesian algorithms.

The system 600 thus provides a way to find similar training sets in a database 332 of training sets for further use. In other words, the system 600 finds similar training datasets to the one provided to it by scoring its performance on other neural networks that have been trained by similar datasets to the one provided. The system 600 may be used to implement a method for scoring similarities between machine learning training sets in a database 332 and/or a method for searching through databases 332 of machine learning training data to find similar datasets.

Aspects of the above described method and system 600 may be summarized with the aid of a flowchart.

Figure 6:
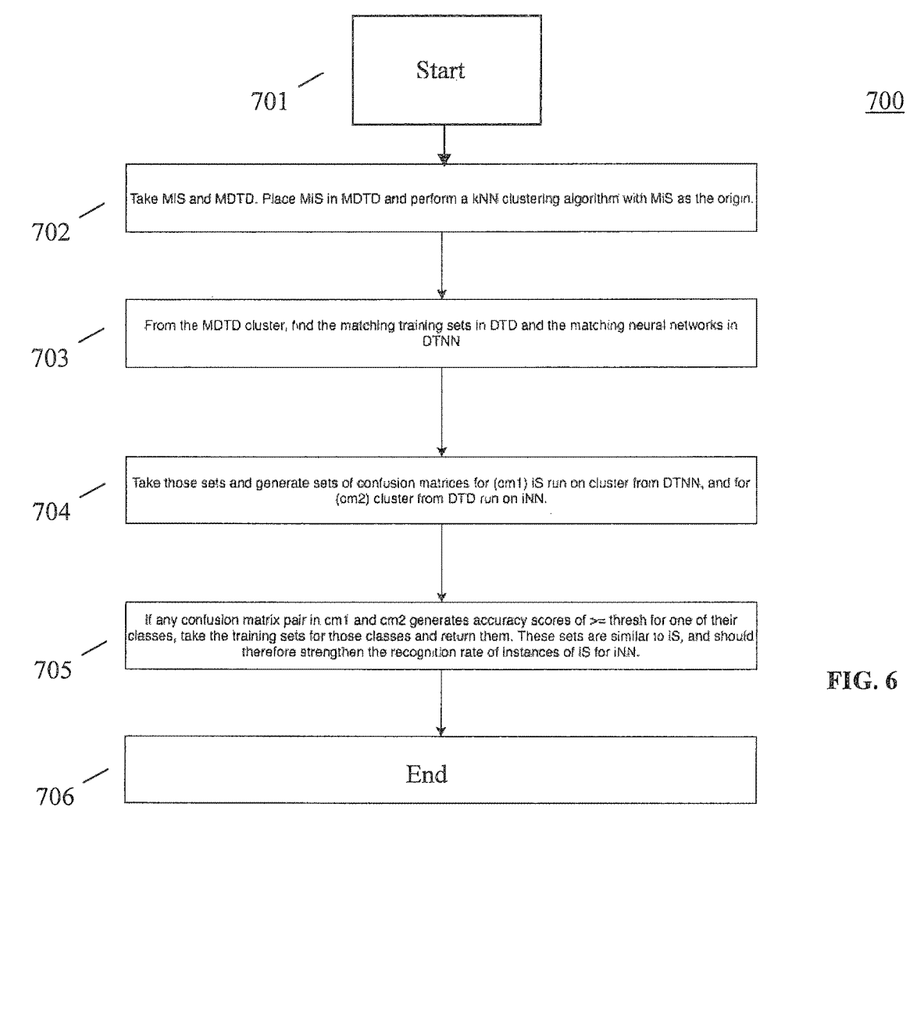

FIG. 6 is a flow chart illustrating operations 700 of modules (e.g., 331) within a data processing system (e.g., 300, 600) for identifying similar datasets in a database (e.g., 332) of machine learning training data, in accordance with an embodiment of the application.

At step 701, the operations 700 start.

At step 702, the metadata 630 of the input set 610 and the set of metadata 660 for the set of training data 640 are received. The metadata of the input set 630 is placed in the set of metadata for the set of training data 660 and a $k^{th}$ clustering algorithm is performed with the metadata of the input set 630 as the origin.

At step 703, from the metadata for the set of training data 660 cluster, the matching training sets in the set of training data 640 and the matching neural networks in the set of neural networks 650 are found or determined.

At step 704, the sets found at step 703 are taken and sets of confusion matrices (cm1, cm2) are generated for the input set 610 run on the cluster from the set of neural networks 650 (i.e., cm1) and for the cluster from the set of training data 640 run on the input neural network 620 (i.e., cm2).

At step 705, if any confusion matrix pair in the confusion matrices generated at step 704 (i.e., cm1, cm2) generates accuracy scores that are greater than or equal to (i.e., >=) the predetermined threshold (i.e., thresh) for one of their classes, then the training sets for those classes are returned. These sets are similar to the input set 610 and should therefore strengthen the recognition rate of instances of the input set 610 for the input neural network 620.

At step 706, the operations 700 end.

According to one embodiment, each of the above steps 701-706 may be implemented by a respective software module 331. According to another embodiment, each of the above steps 701-706 may be implemented by a respective hardware module 321. According to another embodiment, each of the above steps 701-706 may be implemented by a combination of software 331 and hardware modules 321. For example, FIG. 1 may represent a block diagram illustrating the interconnection of specific hardware modules 701-706 (collectively 321) within the data processing system 300, 600, each hardware module 701-706 adapted or configured to implement a respective step of the method of the application.

Thus, according to one embodiment, there is provided a method for providing gesture recognition services to a user application, comprising: storing sets of training data in a database 332 at a server (e.g., 300), the training data received from a sensor 311 associated with the user application, the training data being indicative of characteristics of a gesture, the user application running on a client device (e.g., 300); training a gesture recognition algorithm with the sets of training data to generate a trained gesture recognition algorithm, the output of the trained gesture recognition algorithm being an indication of the gesture; storing the trained gesture recognition algorithm in a client library 110 at the server 300; receiving raw data from the sensor 311 via the user application and storing the raw data in the client library 110; applying the trained gesture recognition algorithm to the raw data; and, when the trained gesture recognition algorithm recognizes the gesture, sending the indication of the gesture from the client library 110 to the user application.

In the above method, the gesture recognition algorithm may be a neural network. Communications between the server 300 and the user application may be by way of an application programming interface ("API") 120, the client library 110 being associated with the API 120. The method may further include authenticating the user application to the server 300 using the API 120. The method may further include establishing an account for the user application with the server 300. The user application may be enabled to access the server 300 only open payment or prepayment to the account. The method may further include determining similar sets of training data within the sets of training data to a predetermined set of training data and training the gesture recognition algorithm with the similar sets of training data to generate the trained gesture recognition algorithm. The determining of the similar sets of training data may be performed by scoring the sets of training data in the database 332 using the predetermined set of training data as a key or seed. The scoring may be performed using a clustering algorithm with the predetermined set of training data as an origin. And, the clustering algorithm may be applied to metadata of the sets of training data using metadata of the predetermined set of training data.

The above embodiments may contribute to an improved method and system for providing gesture recognition services to user applications and may provide one or more advantages. First, the application provides a platform for training and distributing neural networks that are specialized at recognizing gestures. The application allows for the storage and reuse of training data, as well as for the recognition of any gesture, and is not bound to any particular gestural recognition device in contrast to previous solutions. Second, the application provides a gestural recognition neural network whose recognition strategy and implementation is agnostic with respect to the input device. Third, the application provides a gestural recognition neural network that is served up over a cloud API. Fourth, the application provides for the storage and sharing of gestural recognition machine learning training data. And, fifth, the application provides a platform for training gestural recognition neural networks that are served up over a cloud API.

While this application is primarily discussed as a method, a person of ordinary skill in the art will understand that the apparatus discussed above with reference to a data processing system 300 may be programmed to enable the practice of the method of the application. Moreover, an article of manufacture for use with a data processing system 300, such as a pre-recorded storage device or other similar computer readable medium or computer program product including program instructions recorded thereon, may direct the data processing system 300 to facilitate the practice of the method of the application. It is understood that such apparatus, products, and articles of manufacture also come within the scope of the application.

In particular, the sequences of instructions which when executed cause the method described herein to be performed by the data processing system 300 may be contained in a data carrier product according to one embodiment of the application. This data carrier product may be loaded into and run by the data processing system 300. In addition, the sequences of instructions which when executed cause the method described herein to be performed by the data processing system 300 may be contained in a computer software product or computer program product (e.g., comprising a non-transitory medium) according to one embodiment of the application. This computer software product or computer program product may be loaded into and run by the data processing system 300. Moreover, the sequences of instructions which when executed cause the method described herein to be performed by the data processing system 300 may be contained in an integrated circuit product (e.g., a hardware module or modules 321) which may include a coprocessor or memory according to one embodiment of the application. This integrated circuit product may be installed in the data processing system 300.

The embodiments of the application described above are intended to be examples only. Those skilled in the art will understand that various modifications of detail may be made to these embodiments, all of which come within the scope of the application.

What is claimed is:

1. A method for providing gesture recognition services to a user application, comprising:
   storing sets of training data in a database at a server, the training data received from a sensor associated with the user application, the training data being indicative of characteristics of a gesture, the user application running on a client device;
   training a gesture recognition algorithm with the sets of training data to generate a trained gesture recognition algorithm, wherein the output of the trained gesture recognition algorithm is an indication of the gesture and the gesture recognition algorithm is a neural network;
   storing the trained gesture recognition algorithm in a client library at the server;
   receiving raw data from the sensor via the user application and storing the raw data in the client library;
   applying the trained gesture recognition algorithm to the raw data; and,
   when the trained gesture recognition algorithm recognizes the gesture, sending the indication of the gesture from the client library to the user application.

2. The method of claim 1, wherein communications between the server and the user application are by way of an application programming interface ("API"), the client library being associated with the API.

3. The method of claim 2, further comprising authenticating the user application to the server using the API.

4. The method of claim 3, further comprising establishing an account for the user application with the server.

5. The method of claim 4, wherein the user application is enabled to access the server only open payment or prepayment to the account.

6. The method of claim 1, further comprising determining similar sets of training data within the sets of training data to a predetermined set of training data and training the gesture recognition algorithm with the similar sets of training data to generate the trained gesture recognition algorithm.

7. The method of claim 6, wherein the determining of the similar sets of training data is performed by scoring the sets of training data in the database using the predetermined set of training data as a key or seed.

8. The method of claim 7, wherein the scoring is performed using a clustering algorithm with the predetermined set of training data as an origin.

9. The method of claim 8, wherein the clustering algorithm is applied to metadata of the sets of training data using metadata of the predetermined set of training data.

10. A system for providing gesture recognition services to a user application, comprising:
    a processor coupled to memory and an interface to a network; and,
    at least one of hardware and software modules within the memory and controlled or executed by the processor, the modules including:
    a module for storing sets of training data in a database in the memory, the training data received from a sensor associated with the user application, the training data being indicative of characteristics of a gesture, the user application running on a client device;
    a module for training a gesture recognition algorithm with the sets of training data to generate a trained gesture recognition algorithm, wherein the output of the trained gesture recognition algorithm is an indication of the gesture and the gesture recognition algorithm is a neural network;
    a module for storing the trained gesture recognition algorithm in a client library in the system;
    a module for receiving raw data from the sensor via the user application and storing the raw data in the client library;
    a module for applying the trained gesture recognition algorithm to the raw data; and,
    a module for, when the trained gesture recognition algorithm recognizes the gesture, sending the indication of the gesture from the client library to the user application.

11. The system of claim 10, wherein communications between the system and the user application are by way of an application programming interface ("API"), the client library being associated with the API.

12. The system of claim 11, further comprising a module for authenticating the user application to the system using the API.

13. The system of claim 12, further comprising a module for establishing an account for the user application with the system.

14. The system of claim 13, wherein the user application is enabled to access the system only open payment or prepayment to the account.

15. The system of claim 10, further comprising a module for determining similar sets of training data within the sets of training data to a predetermined set of training data and training the gesture recognition algorithm with the similar sets of training data to generate the trained gesture recognition algorithm.

16. The system of claim 15, wherein the module for determining of the similar sets of training data further includes a module for scoring the sets of training data in the database using the predetermined set of training data as a key or seed.

17. The system of claim 16, wherein the scoring is performed using a clustering algorithm with the predetermined set of training data as an origin.

18. The system of claim 17, wherein the clustering algorithm is applied to metadata of the sets of training data using metadata of the predetermined set of training data.

19. The method of claim 1 wherein the neural network is a classifier implemented using at least one of support vector machines, decision trees, and Bayesian algorithms.

20. The method of claim 10 wherein the neural network is a classifier implemented using at least one of support vector machines, decision trees, and Bayesian algorithms.

* * * * *